US012333906B2

(12) United States Patent
Hillstrom et al.

(10) Patent No.: US 12,333,906 B2
(45) **Date of Patent: *Jun. 17, 2025**

(54) PROXIMITY INCREASED CHANCES OF WIN DURING SPECIAL EVENT

(71) Applicant: IGT, Las Vegas, NV (US)

(72) Inventors: Nick Hillstrom, Reno, NV (US); Lauren Hillstrom, Reno, NV (US); Nathan Ajhar, Sparks, NV (US); Chris Peterson, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,606

(22) Filed: Dec. 6, 2023

(65) Prior Publication Data

US 2024/0127673 A1 Apr. 18, 2024

Related U.S. Application Data

(63) Continuation of application No. 17/824,363, filed on May 25, 2022, now Pat. No. 11,893,860.

(51) Int. Cl.
*G07F 17/32* (2006.01)

(52) U.S. Cl.
CPC ...... *G07F 17/3262* (2013.01); *G07F 17/3209* (2013.01); *G07F 17/3223* (2013.01); *G07F 17/323* (2013.01)

(58) Field of Classification Search
None
See application file for complete search history.

(56) References Cited

U.S. PATENT DOCUMENTS

| | | | | |
|---|---|---|---|---|
| 8,672,744 | B1 * | 3/2014 | Gronkowski | G07F 17/323 463/25 |
| 2006/0111170 | A1 * | 5/2006 | Hornik | G07F 17/3267 463/16 |
| 2009/0275392 | A1 | 11/2009 | Lewis | |
| 2012/0178523 | A1 | 7/2012 | Greenberg | |
| 2014/0004927 | A1 * | 1/2014 | Burgess | G07F 17/3244 463/25 |
| 2015/0206388 | A1 | 7/2015 | Berman | |
| 2017/0148252 | A1 * | 5/2017 | Byng | G07F 17/3213 |
| 2019/0066448 | A1 | 2/2019 | Wright | |

* cited by examiner

*Primary Examiner* — Jason T Yen
(74) *Attorney, Agent, or Firm* — Sage Patent Group

(57) ABSTRACT

A computer implemented method of operating a gaming system can include determining that a first event has been triggered on a first electronic gaming machine ("EGM"). The method can further include, responsive to determining that the first event has been triggered on the first EGM, causing a probability of triggering a second event on a second EGM to be adjusted based on a proximity of the second EGM to the first EGM.

20 Claims, 9 Drawing Sheets

PROXIMITY INCREASED CHANCES OF WIN DURING SPECIAL EVENT

RELATED APPLICATIONS

The present application is a Continuation of U.S. patent application Ser. No. 17/824,363, filed May 25, 2022, entitled "PROXIMITY INCREASED CHANCES OF WIN DURING SPECIAL EVENT," the disclosure of which is hereby incorporated herein by reference in its entirety.

BACKGROUND

Embodiments described herein relate to electronic gaming machines (EGMs), and in particular to modifying operation of a game provided by EGMs, and related systems, devices, and methods. In some examples, EGMs in a gaming environment, such as a casino environment, have many different types of hardware configurations and form factors, and may vary from casino to casino and market to market in an attempt to attract players. The probability of an event being triggered by a user playing on a specific EGM can be predetermined based on hardware and/or software included in the EGM.

SUMMARY

According to some embodiments, a computer implemented method of operating a gaming system is provided. The method includes determining that a first event has been triggered on a first electronic gaming machine ("EGM"). The method further includes, responsive to determining that the first event has been triggered on the first EGM, causing an incentive to be provided on a second EGM that is separate from the first EGM based on a proximity of the second EGM to the first EGM.

According to other embodiments, a computer implemented method of operating a first electronic gaming machine ("EGM") is provided. The method includes determining that a first event has been triggered on a second EGM, the second EGM being separate from the first EGM. The method further include, responsive to determining that the first event has been triggered on the second EGM, adjusting a probability of triggering a second event on the first EGM.

According to other embodiments, a computer implemented method of operating a system is provided. The method includes determining that a first event has been triggered on a first electronic gaming machine ("EGM"). The method further includes, responsive to determining that the first event has been triggered on the first EGM, transmitting a message to a second EGM that is separate from the first EGM, the message indicating that the second EGM adjust a probability of triggering a second event on the second EGM.

DETAILED DESCRIPTION

Embodiments described herein relate to electronic gaming machines (EGMs), and in particular to adjusting the probability of a player triggering an event based on a proximity of the player to another player that triggered an event. Traditionally, the probability of an event being triggered by a user playing on a specific EGM can be predetermined based on hardware and/or software included in the EGM. This can lead to potential players not feeling an urgency to play. However, by adjusting the probability of a player triggering an event based on proximity to another player triggering an event, an EGM operator can attract more players and encourage them to play.

Figure 1:
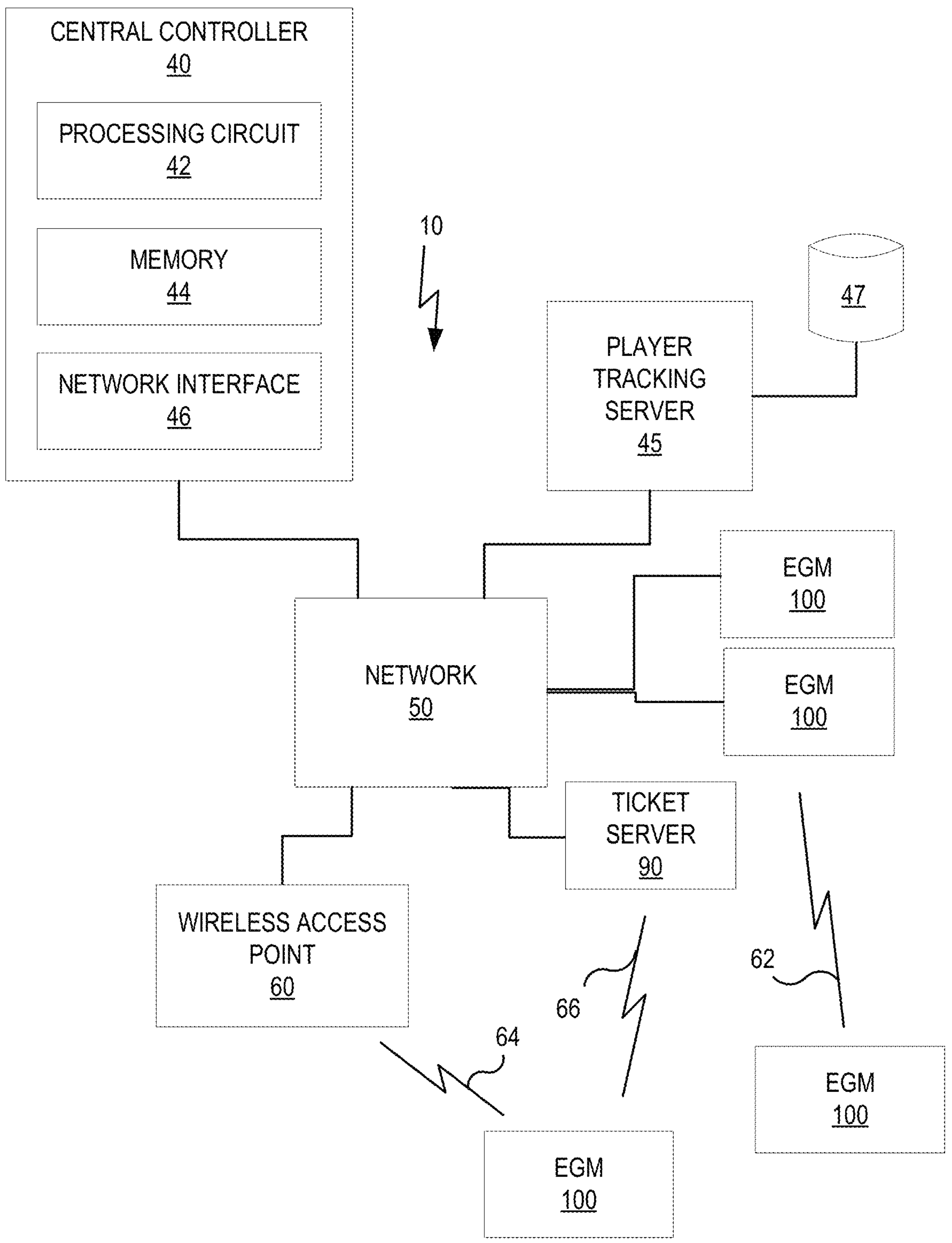
FIG. 1 is a schematic block diagram illustrating an example of a network configuration for a plurality of gaming devices according to some embodiments.

Before describing these and other embodiments in detail, reference is made to FIG. 1, which illustrates a gaming system 10 including a plurality of gaming devices 100. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processor circuit and at least one memory or storage device. Each gaming device 100 may include a processor circuit that transmits and receives events, messages, commands or any other suitable data or signal between the gaming device 100 and the central controller 40. The gaming device processor circuit is operable to execute such communicated events, messages or commands in conjunction with the operation of the gaming device 100. Moreover, the processor circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processor circuits. Moreover, in some embodiments, one or more of the functions of one or more gaming device processor circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processor circuit that transmits and receives events, messages, commands or any other suitable data or signal between the ticket server 90 and the central controller 40. The ticket server 90 processor circuit may be operable to execute such communicated events, messages or commands in conjunction with the operation of the ticket server 90. Moreover, in some embodiments, one or more of the functions of one or more ticket server 90 processor circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
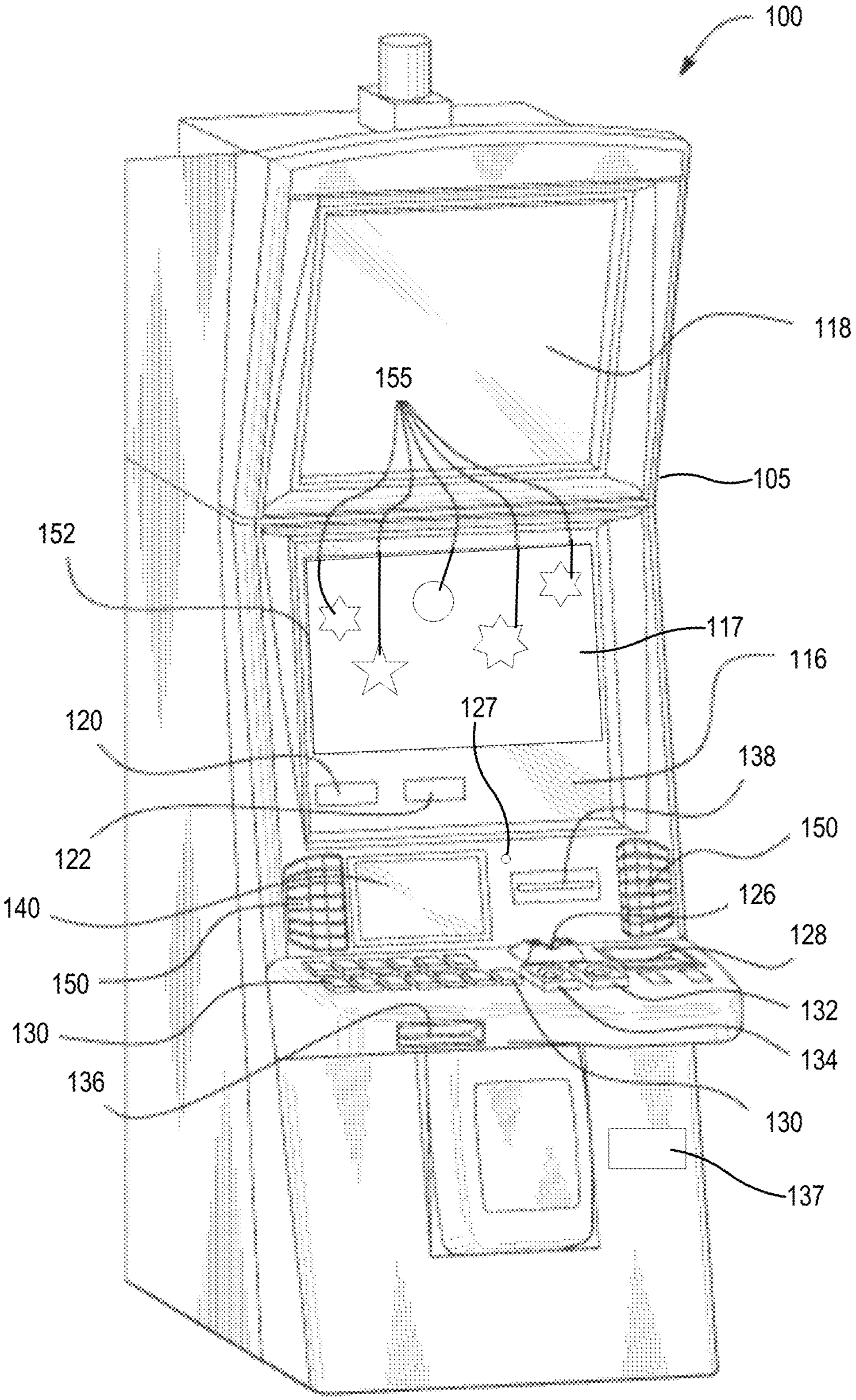
FIGS. 2A-E are diagrams illustrating examples of gaming devices according to various embodiments.
Figure 2B:
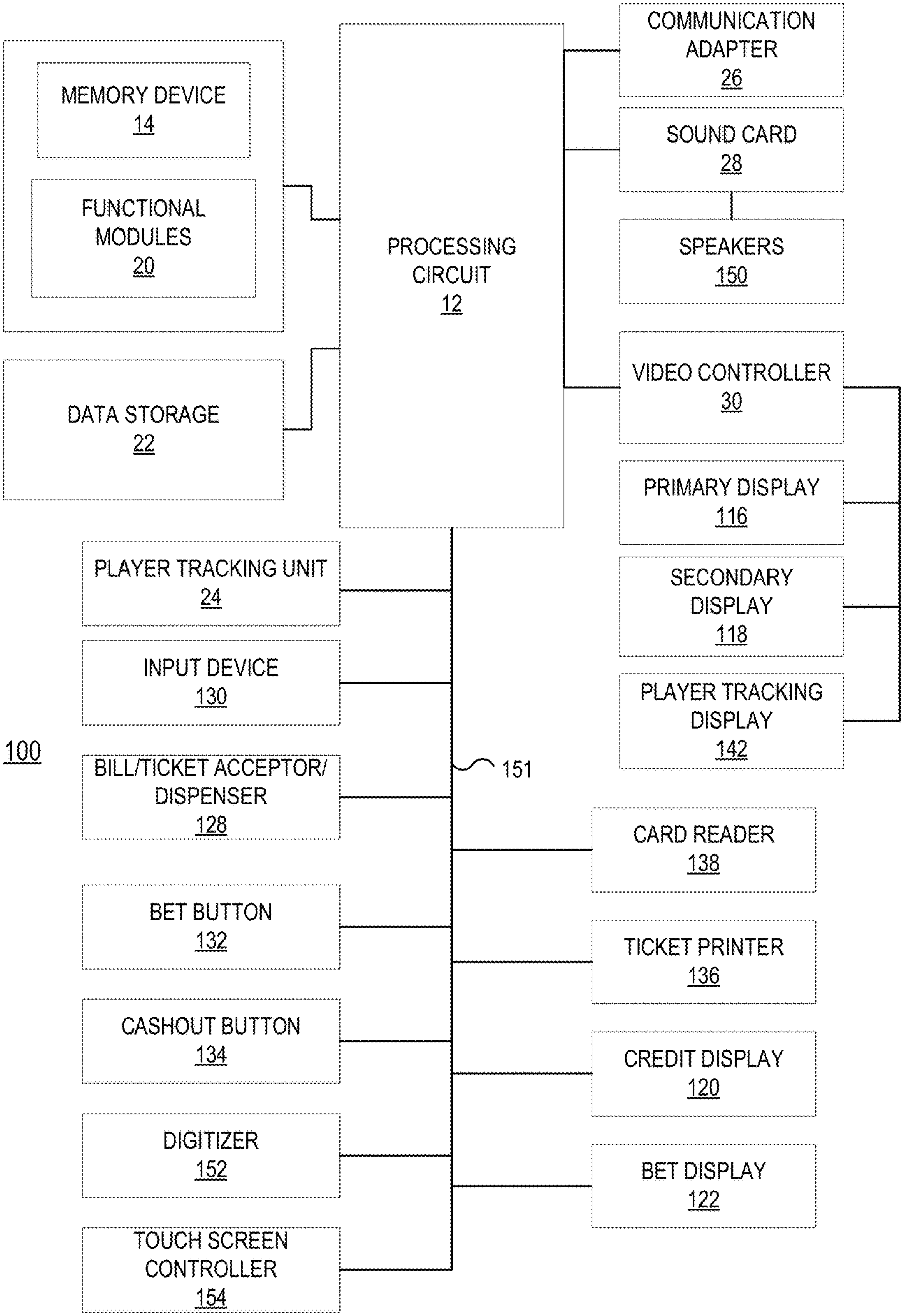
Figure 2C:
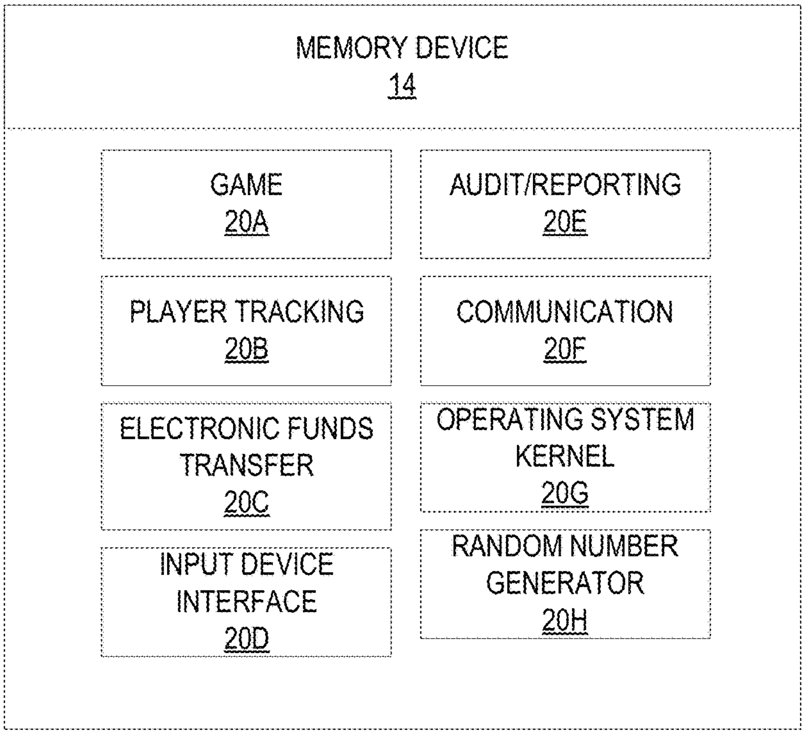

Embodiments herein may include different types of gaming devices. Various embodiments are illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A-C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A-B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30. The gaming device 100 may also include a player tracking unit 24 for managing communications and functionality between the processor circuit 12 and certain peripherals and components. Player tracking units 24 may be standardized across machine types to operate interchangeably across a manufacturer's lineup.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket printer 136, a bill/ticket acceptor/dispenser 128, that allows the player to deposit and/or receive tickets and/or currency into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processor circuit 12 that controls operations of the gaming device 100. Although illustrated as a single processor circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processor circuit 12. It will be appreciated that the components may be connected to the processor circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 100 may include a sensor, such as a camera 127, in communication with the processor circuit 12 (and possibly controlled by the processor circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processor circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Many embodiments described herein employ gaming devices 100 that are land-based EGMs, such as banks of slot machines in a casino environment, but in some embodiments, a gaming device 100 may additionally or alternatively include a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
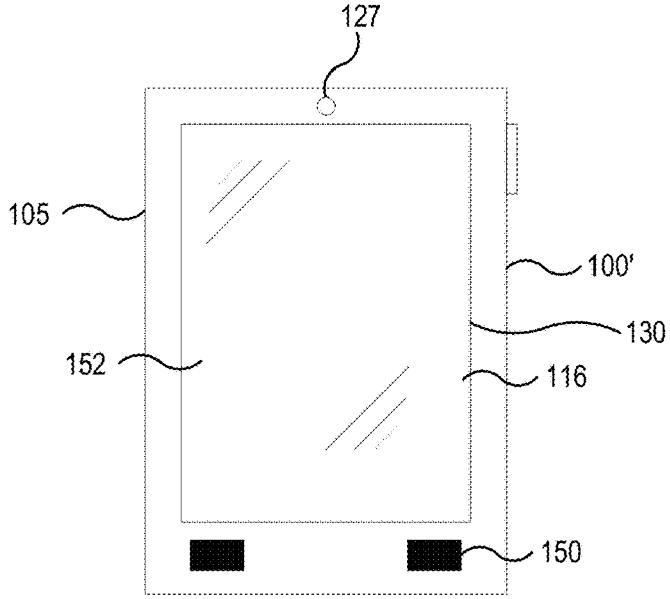

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
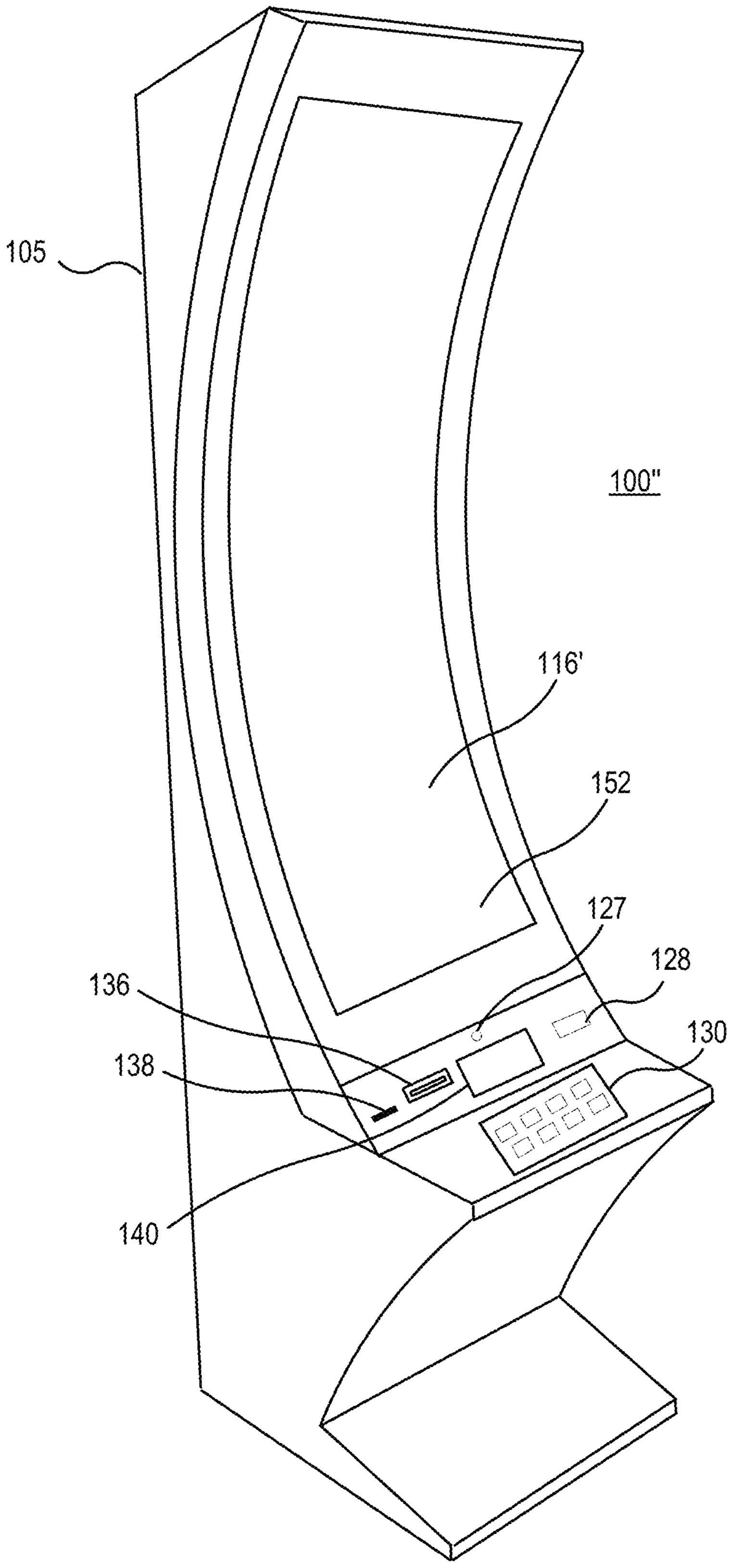

FIG. 2E illustrates a standalone gaming device 100", i.e., an EGM in this example, having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Various embodiments herein describe providing an incentive to play an EGM based on an event occurring on a separate EGM. Providing the incentive can attract more players and provide players with a more exciting experience.

In some embodiments, in response to the action being taken on a first EGM, the incentive is provided to a second EGM based on a proximity of the second EGM to the first EGM. In some examples, the incentive is provided to all EGMs within a certain proximity (e.g., all EGMs in a bank of EGMs that includes the first EGM). In additional or alternative examples, the amount of the incentive is based on the proximity of the EGM such that EGMs that are adjacent to the first EGM in the bank of EGMs are provided a different incentive than EGMs that are further from the first EGM in the bank of EGMs. In additional or alternative examples, the first EGM and/or the second EGM are not located in the same bank of EGMs and the proximity is determined by a physical distance. The first EGM may be a standalone EGM in a casino while the second EGM may be a mobile device.

In additional or alternative embodiments, the incentive is provided to a second EGM based on at least one of: information associated with a first user that triggered the first event; information associated with a second user that is playing a game on the second EGM; an amount being wagered by the second user; a type of the first event; a type of game associated with the first event; and a type of game associated with the second event. In some examples, the information associated with the first user and the second user can include a name, account number, status, birthday, or age of the first user and the second user. The incentive can be provided to all EGMs being played by a user with the same information (or information within a predetermined similarity) as the first user. For example, if the name of the first user is "Christopher," the incentive can be provided to all EGMs being played by users with names starting with "B," "C," or "D."

In additional or alternative embodiments, the incentive includes an increased probability of a second event occurring. In some examples, the second event includes winning such that the incentive includes an increased probability of winning. In additional or alternative examples, the second event is the same as the first event (which triggered the incentive). The first event and the second event can include initialization of a bonus event or obtaining a specific winning combination. In additional or alternative embodiments, the incentive includes a number of free spins.

In additional or alternative embodiments, the incentive is only available for a limited time. In some examples, the limited time is a predetermined number of spins or a predetermined amount of time. In additional or alternative examples, the limited time corresponds to a length of the first event.

FIGS. 3-7 illustrate examples of providing incentives to one or more EGMs in response to a winning event occurring on an EGM.

Figure 3:
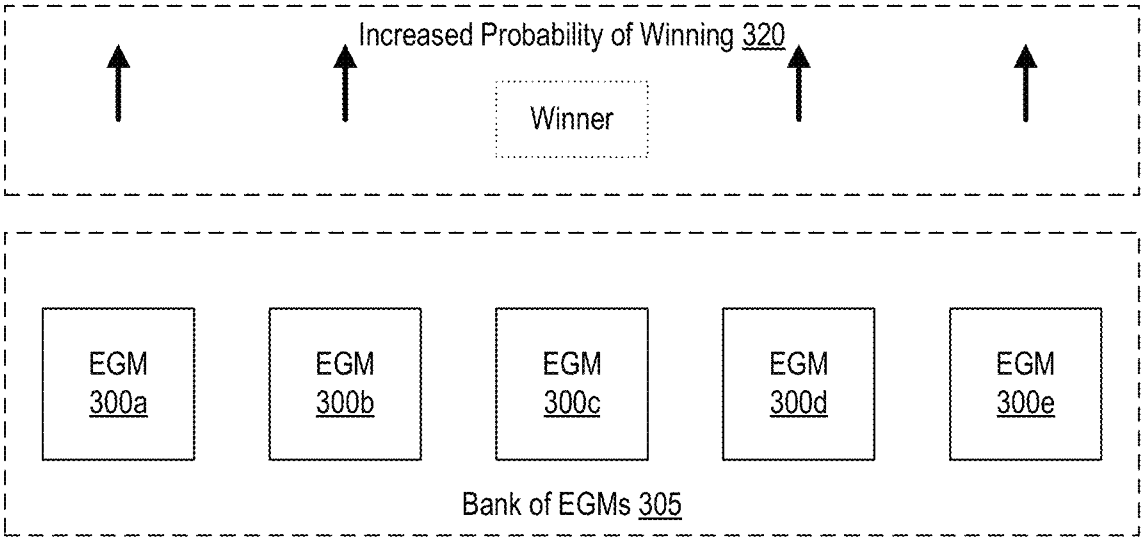
FIGS. 3-6 are diagrams illustrating examples of an increase in a probability of winning at different EGMs in a bank of EGMs in response to a winning event on one of the EGMs in the bank of EGMs according to some embodiments.

FIG. 3 illustrates a bank of EGMs 305 including EGMs 300*a*-*e*. In response to a winning event on EGM 300*c*, EGMs 300*a*-*b* and EGMs 300*d*-*e* each have an increased probability of winning 320 based on being in the same bank of EGMs 305. As illustrated, each of the EGMs 300*a*-*b* and EGMs 300*d*-*e* have an equal increased probability of winning Although not illustrated, EGM 300*c* may also have an increased probability of winning.

Figure 4:
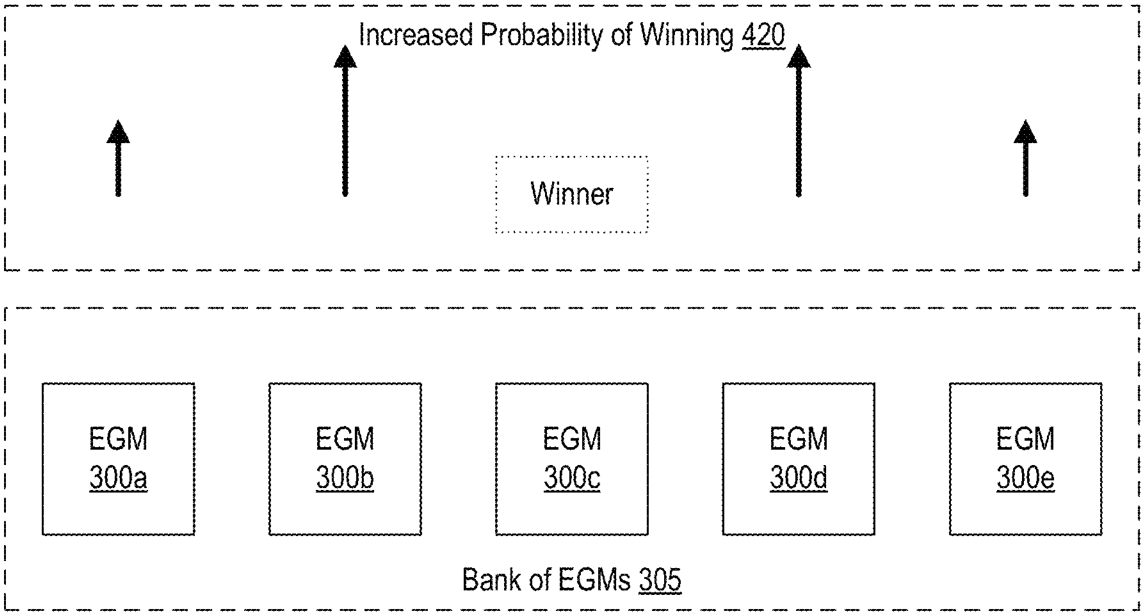

FIG. 4 illustrates the same bank of EGMs 305 including EGMs 300*a*-*e*. In response to the winning event on EGM 300*c*, EGMs 300*a*-*b* and EGMs 300*d*-*e* each have an increased probability of winning 420 based on being in the same bank of EGMs 305. However, as illustrated, EGMs 300*b*, 300*d* have a greater increased probability of winning than EGMS 300*a*, 300*e* based on being closer to EGM 300*c*. Although not illustrated, EGM 300*c* may also have an increased probability of winning that may be higher or lower than the other EGMs.

Figure 5:
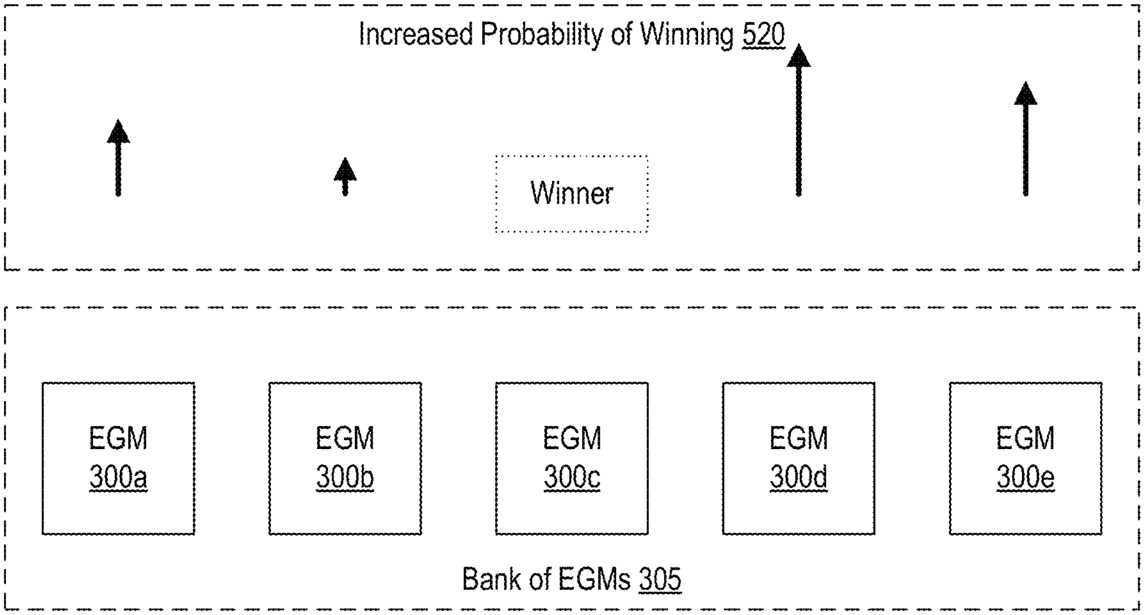

FIG. 5 illustrates the same bank of EGMs 305 including EGMs 300*a*-*e*. In response to the winning event on EGM 300*c*, EGMs 300*a*-*b* and EGMs 300*d*-*e* each have an increased probability of winning 520 based on being in the same bank of EGMs 305. However, as illustrated, EGMs 300*a*-*b* and EGMs 300*d*-*e* each have a different increased probability based on their position relative to the EGM 300*c*. Although not illustrated, EGM 300*c* may also have an increased probability of winning that may be higher or lower than the other EGMs.

Figure 6:
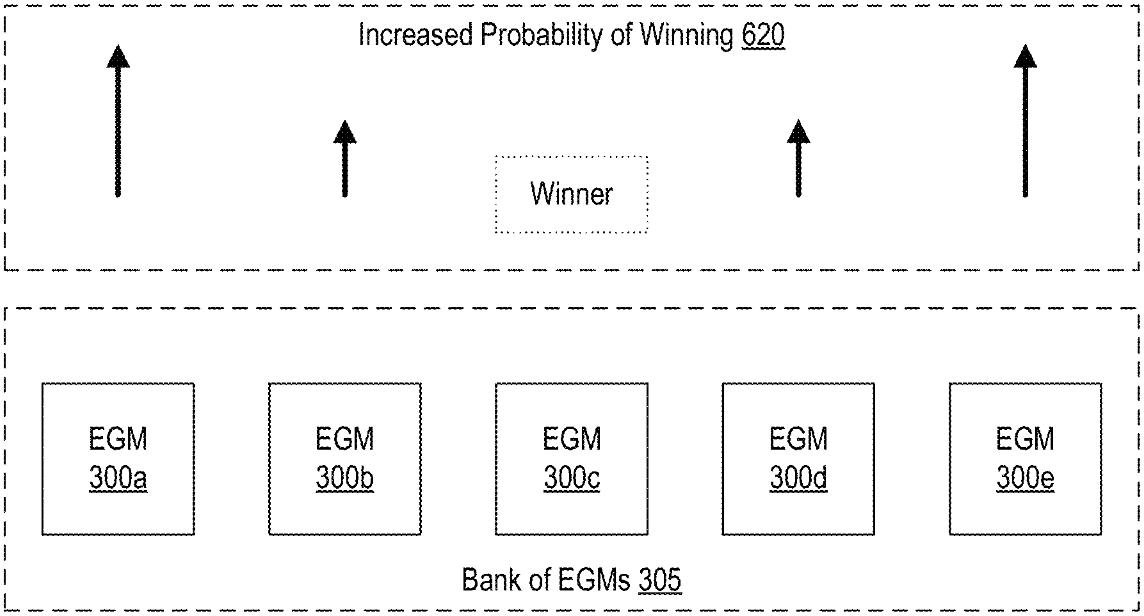

FIG. 6 illustrates the same bank of EGMs 305 including EGMs 300*a*-*e*. In response to the winning event on EGM 300*c*, EGMs 300*a*-*b* and EGMs 300*d*-*e* each have an increased probability of winning 620 based on being in the same bank of EGMs 305. However, as illustrated, EGMs 300*b*, 300*d* have a lower increased probability of winning than EGMS 300*a*, 300*e* based on being closer to EGM 300*c*.

Although not illustrated, EGM 300*c* may also have an increased probability of winning that may be higher or lower than the other EGMs.

Although FIGS. 3-6 illustrate EGMs receiving an increased probability based on being within the same bank of EGMs as a winning EGM other implementations are possible. In some examples, a different incentive (e.g., a number of free spins) are provided to EGMs based on being within the same bank of EGMs as the winning EGM. In additional or alternative examples, a different first event (e.g., triggering a bonus event or gameplay by a player with a special status) triggers the incentive. In additional or alternative examples, the EGMs receiving the incentive may not be in the same bank of EGMs as the first EGM.

Figure 7:
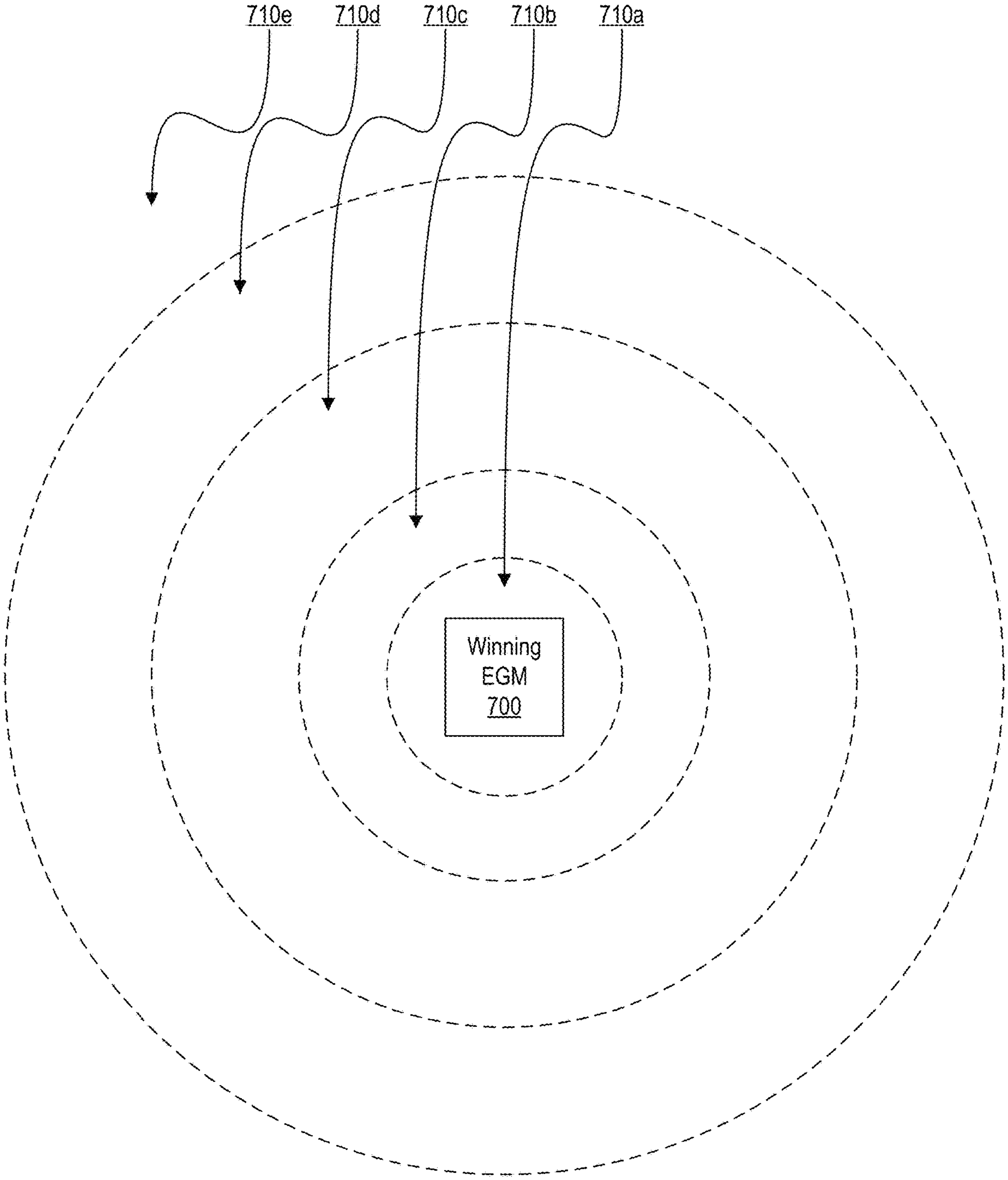
FIG. 7 is a diagram illustrating an example of different regions relative to a winning EGM according to some embodiments.

FIG. 7 illustrates different regions 710*a-e* based on proximity to a winning EGM 700. In some examples, the winning EGM 700 may be a mobile device, region 710*a* can be the building EGM 700 is in, region 710*b* can be a 1 mile radius of EGM 700, region 710*c* can be the same city that EGM 700 is in, region 710*d* can be the same state that EGM 700 is in, and region 710*e* can be the rest of the world. EGMs in each region 710*a-e* can receive a different incentive or amount of incentive.

Figure 8:
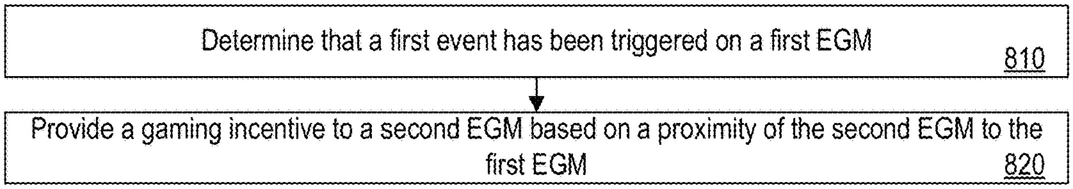
FIGS. 8-11 are flow charts illustrating examples of operations according to some embodiments.

FIG. 8 illustrates an example of operations performed by a system according to some embodiments. The operations are described below as being performed by the central controller 40 of system 10 in FIG. 1. However, the operations can be performed by any one or more suitable elements of a system including or communicatively coupled to electronic gaming devices.

At block 810, processing circuit 42 determines that a first event has been triggered on a first EGM. In some embodiments, determining that the first event has been triggered includes receiving an indication from the first EGM that the first event has been triggered. In additional or alternative embodiments, the first event includes at least one of: a winning combination; initiation of a bonus game; a wager above a threshold; a number of winning combinations in a row; and gameplay by a user with a special characteristic. In some examples, the special characteristic can include a birthday, wedding, or anniversary.

At block 820, processing circuit 42 provides a gaming incentive to a second EGM based on a proximity of the second EGM to the first EGM. In some embodiments, the first EGM and the second EGM may be part of a bank of EGMs. The proximity may be a position of the first EGM in the bank of EGMs relative to a position of the second EGM in the bank of EGMs. In additional or alternative embodiments, the first EGM and/or the second EGM may be part of a mobile device. The proximity may be a physical distance between the first EGM and the second EGM.

In additional or alternative embodiments, the gaming incentive includes a number of free spins. For example, if a specific combination of winning symbols (e.g., 5 free spin icons) are obtained in a game on a first EGM that is in the middle of a bank of five EGMs (e.g., EGM 300*c* in the bank of EGMs 305 in FIG. 4), adjacent EGMs (e.g., EGMs 300*b*, 300*d*) may receive 10 free spins and next-adjacent EGMs (e.g., EGMs 300*a*, 300*e*) may receive 5 free spins.

In additional or alternative embodiments, the gaming incentive includes an increased probability of winning. In some examples, in response to a player entering a bonus game on a first EGM, a player on a second EGM may have an increased chance of winning. The chance of winning can be increased based on a proximity of the second EGM to the first EGM. For example, adjacent EGMs to the first EGM may have a 10% increased chance of winning, EGMs in the same bank of EGMs as the first EGM (but not adjacent) may have a 5% increased chance of winning, and all EGMs in the same casino as the first EGM (but not in the bank of EGMs) may have a 1% increased chance of winning.

In additional or alternative embodiments, the gaming incentive is only available for a predetermined period of time and/or to specific users. In some examples, the predetermined period of time is a number of minutes. In additional or alternative embodiments, the gaming incentive is only available for a period of time that is associated with the first event. For example, if the first event is the initiation of a bonus game, the gaming incentive may only be available while the bonus game is in progress. In additional or alternative embodiments, the gaming incentive is only available until a number of users have taken advantage of the gaming incentive. For example, the free spins may only be available to the first ten users to use the free spins.

In some embodiments, potential players may be incentivized by the gaming incentive. In some examples, potential players are alerted to the gaming incentives based on visual indicators displayed on a display screen and/or audible indicators output by a speaker.

In additional or alternative embodiments, potential players may be incentivized by the ability to provide the gaming incentive. In some examples, a potential player can be offered a special status in response to an achievement (e.g., birthday, anniversary, achieving a new tier status, or getting married). The first event can be triggered by gameplay by a player with the special status. As a result, players may be incentivized to play proximate to the player with the special status.

Various operations of FIG. 8 may be optional.

Figure 9:
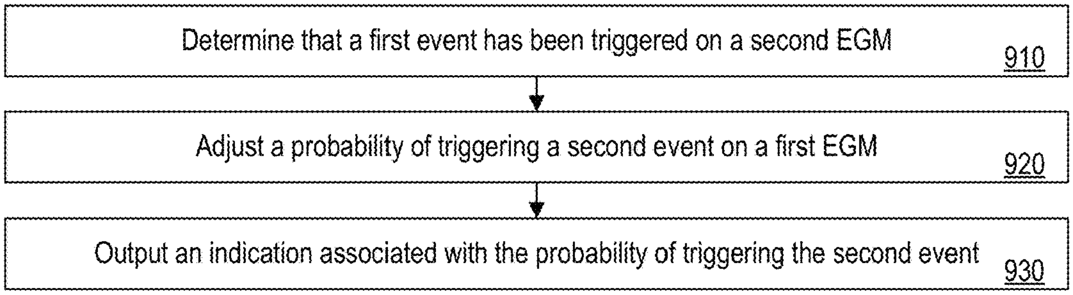

FIG. 9 illustrates an example of operations performed by a first EGM. The operations are described below as being performed by EGM 100 of FIG. 2B. However, the operations can be performed by any suitable gaming device.

At block 910, processing circuit 12 determines that a first event has been triggered on a second EGM. In some embodiments, determining that the first event has been triggered on the second EGM includes receiving a message from the second EGM or a controller device, the message indicating that the probability of triggering the second event on the first EGM be adjusted.

At block 920, processing circuitry 12 adjusts a probability of triggering a second event on a first EGM. In some examples, the probability is adjusted in response to determining that the first event has been triggered.

In some embodiments, a type of the first event and a type of the second event are the same. In some examples, the first event and the second event are both a specific prize being won. In additional or alternative examples, the first event and the second event are both bonus games being initiated. In additional or alternative embodiments, a type of the first event and a type of the second event are different. In some examples, the first event is a specific winning combination and the second event includes all winning combinations.

In additional or alternative embodiments, adjusting the probability of triggering the second event includes adjusting the probability of triggering the second event based on at least one of: a proximity of the first EGM to the second EGM; information associated with a first user that triggered the first event; information associated with a second user that is playing a game on the first EGM; an amount being wagered by the second user; a type of the first event; a type of game associated with the first event; and a type of game associated with the second event.

In additional or alternative embodiments, adjusting the probability of triggering the second event based on the proximity of the first EGM to the second EGM includes determining a physical distance between the first EGM and the second EGM; and adjusting the probability of triggering the second event based on the physical distance being less than one or more threshold distances. In some examples, the first EGM and the second EGM are in a bank of EGMs physically located together in a casino. The threshold distances may be associated with a number of EGMs between the first EGM and the second EGM in the bank of EGMs such that the probability of triggering the second event on the first EGM may be adjust based on the number of EGMs between the first EGM and the second EGM.

In additional or alternative examples, processing circuitry 12 can determine the location of the first EGM and the location of the second EGM. In some examples, processing circuitry 12 receives the location of the first EGM and/or the second EGM. In additional or alternative examples, processing circuitry 12 determines the location of the first EGM or the second EGM based on their location being predetermined/fixed. In additional or alternative examples, the first EGM (and/or the second EGM) is included on (or provided by) a mobile device. The location of the mobile device can be determined based on a global positioning system (GPS) position of the mobile device, an internet protocol address associated with the mobile device, or a location of an access point to which the communication device is connected.

In additional or alternative embodiments, adjusting the probability of triggering the second event includes adjusting the probability of triggering the second event based on information associated with a first user that triggered the first event and information associated with a second user that is playing a game on the first EGM. The information associated with the first user can include an identifier of the first user and the information associated with the second user can include an identifier of the second user. The identifier can include a name or an account number. In some examples, adjusting the probability of triggering the second event includes adjusting the probability of triggering the second event based on a difference between the identifier of the first user and the identifier of the second user being less than a threshold amount. If the identifiers are names, the threshold amount can be a number of letters different (alphabetically) than the first letter of each name. The size of the difference can affect how much the probability is changed. For example, users sharing the same first letter in their name as the name of the winning user can have their probability increased by a first amount and users with a first letter in their name within 5 letters can have their probability increased by a second amount.

In additional or alternative examples, the information includes a status tier (e.g., a loyalty/rewards status offered by a casino associated with the EGMs), a birthday, an age, or a room number.

In additional or alternative embodiments, adjusting the probability of triggering the second event includes adjusting the probability of triggering the second event for a period of time or a number of spins. In some examples, the period of time or the number of spins are determined based on at least one of: a proximity of the first EGM to the second EGM; information associated with a first user that triggered the first event; information associated with a second user that is playing a game on the first EGM; a type of the first event; an amount being wagered by the second user; a type of game associated with the first event; and a type of game associated with the second event.

At block 930, processing circuitry 12 outputs an indication associated with the probability of triggering the second event. In some embodiments, outputting the indication includes displaying a visual indication on a display associated with the first EGM or generating an auditory indication via a speaker associated with the first EGM.

Various operations of FIG. 9 may be optional. For example, in some embodiments, block 930 may be optional.

Figure 10:
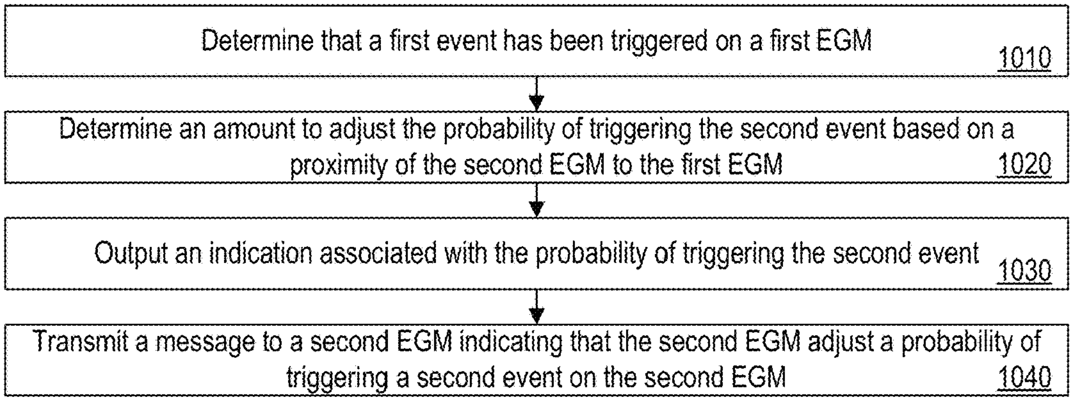

FIG. 10 illustrates an example of operations performed by a system. The operations are described below as being performed by EGM 100 of FIG. 1 using the structure illustrated in FIG. 2B. However, the operations can be performed by any one or more suitable elements of a system including or communicatively coupled to electronic gaming devices. For example, the operations could be performed by the central controller 40 of system 10 in FIG. 1.

At block 1010, processing circuitry 12 determines that a first event has been triggered on a first EGM. In some embodiments, processing circuitry 12 is part of the first EGM and directly determines that the first event has been triggered. In additional or alternative embodiments, the processing circuitry 12 is part of the second EGM and receives, via communication adapter 26, an indication that the first event has been triggered.

At block 1020, processing circuitry 12 determines an amount to adjust the probability of triggering the second event based on a proximity of the second EGM to the first EGM. In some examples, as described above in regards to FIGS. 3-7, the probability can be increased by more the closer the second EGM is to the first EGM or by more the farther the second EGM is to the first EGM.

At block 1030, processing circuitry 12 outputs an indication associated with the probability of triggering the second event. In some examples, the indication is output by speaker 150, primary display 116, and/or secondary display 118. In additional or alternative examples, the indication is output by another device in the system (e.g., the speaker 150, primary display 116, and/or secondary display 118 of the second EGM).

At block 1040, processing circuitry 12 transmits, via communication adapter 26, a message to a second EGM indicating that the second EGM adjust a probability of triggering a second event on the second EGM. In some embodiments, transmitting the message includes transmitting an indication of the amount to adjust the probability of triggering the second event. In additional or alternative embodiments, the message includes at least one of an indication of: a proximity of the second EGM to the first EGM; information associated with a first user that triggered the first event; information associated with a second user that is playing a game on the second EGM; an amount being wagered by the second user; a type of the first event; a type of game associated with the first event; and a type of game associated with the second event.

Various operations of FIG. 10 may be optional. For example, blocks 1030 and 1040 of FIG. 10 may be optional.

Figure 11:
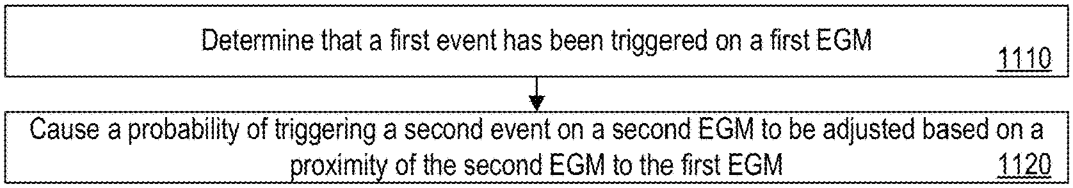

FIG. 11 illustrates an example of additional or alternative operations performed by a system. The operations are described below as being performed by the central controller 40 of system 10 in FIG. 1. However, the operations can be performed by any one or more suitable elements of a system including or communicatively coupled to electronic gaming devices. For example, the operations could be performed by EGM 100. At block 1110, processing circuitry 42 determines that a first event has been triggered on a first EGM. At block 1120, processing circuitry 42 causes a probability of triggering a second event on a second EGM to be adjusted based on a proximity of the second EGM to the first EGM.

Various operations of FIG. 11 may be optional.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the FIGS. illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A computer implemented method of operating a gaming system, the method comprising:

determining that a first event has been triggered on a first electronic gaming machine ("EGM"); and responsive to determining that the first event has been triggered on the first EGM, causing a probability of triggering a second event on a second EGM to be adjusted based on a proximity of the second EGM to the first EGM.

2. The computer implemented method of claim 1, wherein the second EGM is separate from the first EGM, and wherein causing the probability of triggering the second event on the second EGM to be adjusted based on the proximity of the second EGM to the first EGM comprises transmitting a message to the second EGM, the message indicating that the second EGM adjust the probability of triggering the second event on the second EGM.

3. The computer implemented method of claim 2, further comprising:

responsive to determining that the first event has been triggered on the first EGM, determining an amount to adjust the probability of triggering the second event based on the proximity of the second EGM to the first EGM, wherein transmitting the message comprises transmitting an indication of the amount to adjust the probability of triggering the second event.

4. The computer implemented method of claim 2, wherein the message comprises an indication of:

the proximity of the second EGM to the first EGM;

a location of the first EGM; and information associated with a first user that triggered the first event.

5. The computer implemented method of claim 1, wherein determining that the first event has been triggered on the first EGM comprises receiving an indication from the first EGM that the first event has been triggered.

6. The computer implemented method of claim 1, further comprising:

responsive to determining that the first event has been triggered on the first EGM, outputting an indication associated with the probability of triggering the second event, wherein outputting the indication comprises displaying a visual indication on a display or generating an auditory indication via a speaker.

7. A computer implemented method of operating a first electronic gaming machine ("EGM"), the method comprising:

determining that a first event has been triggered on a second EGM, the second EGM being separate from the first EGM; and responsive to determining that the first event has been triggered on the second EGM, adjusting a probability of triggering a second event on the first EGM.

8. The computer implemented method of claim 7, wherein adjusting the probability of triggering the second event comprises adjusting the probability of triggering the second event based on a proximity of the first EGM to the second EGM, wherein adjusting the probability of triggering the second event based on the proximity of the first EGM to the second EGM comprises:

determining a physical distance between the first EGM and the second EGM; and adjusting the probability of triggering the second event based on the physical distance being less than one or more threshold distances.

9. The computer implemented method of claim 8, wherein determining the physical distance between the first EGM and the second EGM comprises:

determining a location of the first EGM; and receiving an indication of a location of the second EGM from the second EGM or a controller device.

10. The computer implemented method of claim 7, wherein adjusting the probability of triggering the second event comprises adjusting the probability of triggering the second event based on a proximity of the first EGM to the second EGM, and wherein adjusting the probability of triggering the second event based on the proximity of the first EGM to the second EGM comprises:

determining that the first EGM and the second EGM are part of a bank of EGMs; and adjusting the probability of triggering the second event based on a position of the first EGM in the bank of EGMs relative to a position of the second EGM in the bank of EGMs.

11. The computer implemented method of claim 7, wherein adjusting the probability of triggering the second event comprises adjusting the probability of triggering the second event based on information associated with a first user that triggered the first event and information associated with a second user that is playing a game on the first EGM, wherein the information associated with the first user comprises an identifier of the first user, wherein the information associated with the second user comprises an identifier of the second user, and wherein adjusting the probability of triggering the second event comprises adjusting the probability of triggering the second event based on a difference between the identifier of the first user and the identifier of the second user being less than a threshold amount.

12. The computer implemented method of claim 7, wherein adjusting the probability of triggering the second event comprises adjusting the probability of triggering the second event for a period of time or a number of spins.

13. The computer implemented method of claim 12, wherein the period of time or the number of spins are determined based on a proximity of the first EGM to the second EGM.

14. The computer implemented method of claim 12, wherein the period of time or the number of spins are determined based on information associated with a first user that triggered the first event and information associated with a second user that is playing a game on the first EGM.

15. The computer implemented method of claim 7, wherein determining that the first event has been triggered on the second EGM comprises receiving a message from the second EGM or a controller device, the message indicating that the probability of triggering the second event on the first EGM be adjusted.

16. The computer implemented method of claim 7, further comprising:

responsive to determining that the first event has been triggered on the second EGM, outputting an indication associated with the probability of triggering the second event.

17. The computer implemented method of claim 16, wherein outputting the indication comprises displaying a visual indication on a display associated with the first EGM or generating an auditory indication via a speaker associated with the first EGM.

18. The computer implemented method of claim 7, wherein the first event comprises a prize being won.

19. The computer implemented method of claim 7, wherein a type of the first event and a type of the second event are the same.

20. A computer implemented method of operating a system, the method comprising:

determining that a first event has been triggered on a first electronic gaming machine ("EGM"); and responsive to determining that the first event has been triggered on the first EGM, transmitting a message to a second EGM that is separate from the first EGM, the message indicating that the second EGM adjust a probability of triggering a second event on the second EGM.

* * * * *